(12) United States Patent
Doufas et al.

(10) Patent No.: US 8,044,135 B2
(45) Date of Patent: Oct. 25, 2011

(54) POLYPROPYLENE IMPACT COPOLYMER COMPOSITIONS

(75) Inventors: Antonios K. Doufas, Pittsburgh, PA (US); Carol R. Barvinchak, Gibsonia, PA (US); Edward Catalina, Greensburgh, PA (US)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 12/711,616

(22) Filed: Feb. 24, 2010

(65) Prior Publication Data

US 2011/0207883 A1    Aug. 25, 2011

(51) Int. Cl.
C08L 23/00 (2006.01)
C08L 53/00 (2006.01)
(52) U.S. Cl. .......................................... 524/528; 525/88
(58) Field of Classification Search ................... 524/528
See application file for complete search history.

(56) References Cited

U.S. PATENT DOCUMENTS

| | | | |
|---|---|---|---|
| 5,929,147 A | 7/1999 | Pierick et al. | |
| 5,973,078 A | 10/1999 | Pinoca et al. | |
| 6,284,833 B1 | 9/2001 | Ford et al. | |
| 6,300,415 B1 | 10/2001 | Okayama et al. | |
| 6,469,100 B2 * | 10/2002 | Suzuki et al. | 525/88 |
| 6,943,215 B2 | 9/2005 | Stevens et al. | |
| 7,217,768 B2 | 5/2007 | Salek et al. | |
| 7,226,977 B2 | 6/2007 | Kim et al. | |
| 7,348,381 B2 | 3/2008 | Bodiford et al. | |
| 7,482,406 B2 * | 1/2009 | News et al. | 525/240 |

FOREIGN PATENT DOCUMENTS

| | | |
|---|---|---|
| DE | 2549538 A1 | 5/1977 |
| JP | 06157867 A | 11/1992 |
| JP | 08091370 A | 4/1996 |
| JP | 200395268 A | 4/2003 |

OTHER PUBLICATIONS

Chaffin et al., "High-Strength Welds in Metallocene Polypropylene/Polyethylene Laminates," Science, vol. 288, Jun. 23, 2000.

* cited by examiner

Primary Examiner — Ling Choi
Assistant Examiner — Hui Chin
(74) Attorney, Agent, or Firm — Duane Morris LLP

(57) ABSTRACT

The present invention relates to an impact-resistant olefin polymer composition including a polypropylene matrix having a weight average molecular weight and an ethylene-containing polymer including an ethylene-propylene copolymer having a molecular weight higher than the weight average molecular weight of the polypropylene matrix, the composition containing about 20 to 35 percent xylene solubles, and the xylene solubles fraction of the composition containing less than about 39 weight percent ethylene units, based on the combined weight of olefin monomers in the copolymer. The present invention further relates to impact copolymer compositions with a melt flow rate greater than about 8 that meet or exceed all pallet testing requirements. The compositions have superior stiffness-impact balance performance and excellent gloss and are useful for a number of applications including, but not limited to pallets, water-storm chambers, automotive compounding, septic tanks, bins, pales, crates, totes and plastic containers.

11 Claims, No Drawings

POLYPROPYLENE IMPACT COPOLYMER COMPOSITIONS

FIELD OF THE INVENTION

The present invention relates to polypropylene impact copolymer (ICP) compositions of superior stiffness/impact balance, enhanced gloss (for surface appearance) and reduced cycle time in injection molding processes.

BACKGROUND OF THE INVENTION

In industrial applications such as the manufacture of polypropylene (PP) pallets, a highly demanding balance of stiffness (rigidity) and impact strength is required. For example, the pallet needs to respond in a ductile fashion (i.e., no brittle failures) when impacted by a heavy object, e.g., three orders of magnitude heavier than the pallet (sled) at a defined speed (referred to as the "sled impact test") so that the pallet can be reused. At the same time, no cracking (brittle failure) is acceptable, when the pallet is dropped from a relatively high height (e.g., 5-20 feet) on one of its corners (referred to as the "corner drop impact test"). In addition, the ICP composition needs to possess enhanced creep resistance, so that a pallet having a weight of e.g., about two orders of magnitude higher than the pallet weight layered on top of it for an extended period of time (e.g., 20-40 days) at a relatively high temperature (e.g., 40-50° C.) does not deflect above a certain strain level (e.g., deflection less than a certain predefined amount).

The latter may be referred to as a "pallet deflection test." Alternatively, pallet tests related conceptually to the tests noted above are described in ASTM D1185-98A. ASTM D1185-98A does not disclose specific values/requirements for creep deflection, as they can be application dependent.

In addition, the melt rheology of the material should be such that reduced cycle times and reduced injection pressures can be achieved during the injection molding process. Therefore, a higher melt flow rate (MFR) ICP is desired from a process performance viewpoint to reduce cycle time and increase productivity.

In order to meet such demanding product requirements, a proper molecular design of the ICP material is important. Typically, when the material has increased rigidity (e.g., passes the deflection test), it decreases in impact resistance (e.g., fails the drop impact and/or sled impact tests), since rigidity and impact strength normally work against each other. While a higher MFR material (i.e., one with a lower molecular weight) favors processability, it hurts the impact strength leading to brittle failures associated with the drop impact and/or sled impact tests. Therefore, designing the molecular architecture of a high MFR ICP that meets both rigidity and impact requirements is counterintuitive by nature.

U.S. Pat. No. 6,284,833 discloses reactor olefin polymer compositions comprising isotactic polypropylene as a continuous phase and an ethylene-propylene rubber (EPR) copolymer as a discontinuous phase having good paintability, and that are particularly attractive for use in the production of automotive trim and fascia. However, the disclosed EPR composition is C2(ethylene)-rich, comprising of 40-55% wt. C2. Such a composition may be detrimental for passing severe impact situations such as the sled impact test for the pallets (e.g., see comparative example IV in Tables 1 and 2, below). The compositions of the present invention are vastly different from these compositions, in that the rubber is C3(propylene)-rich (as approximated by the percent C2 in xylene soluble fraction (XS) of less than about 39%); this is an important element in combination with other molecular design characteristics in achieving optimum stiffness-impact balance, especially in the case of the pallet application and water-storm chambers.

U.S. Pat. No. 7,482,406 relates to a polypropylene impact copolymer-type composition, which requires a highly isotactic/crystalline matrix with percent mmmm (meso-pentads) homopolypropylene (HPP) xylene insolubles (XIS) greater than 98% to achieve good stiffness-impact balance. This is in contrast to the present invention, which preferably and surprisingly utilizes a less isotactic matrix (e.g., % mmmm XIS of about 96.4-97.8%) to achieve superior stiffness-impact balance performance.

U.S. Pat. No. 5,929,147 discloses an embrittlement-resistant polyolefin composition which is a blend of at least 80% by weight of a crystalline polymer, comprising either a propylene homopolymer or a random copolymer of propylene and either ethylene or C4-C10 1-olefins and less than 20% of an elastomeric copolymer. This is in contrast to the compositions of the present invention which contain at least 20% elastomeric component and are opaque (haze is typically greater than 70%).

U.S. Pat. No. 7,348,381 relates to compositions comprising a polypropylene homopolymer portion and an ethylene-propylene rubber (EPR) portion interspersed therein. The reference states that reduced molecular weight (with low intrinsic viscosity) of the elastomer modifier adversely affects the impact strength of the thermoplastic olefin composition (column 3, lines 3-8), contrary to the present invention.

U.S. Pat. No. 6,300,415 discloses propylene compositions comprising a propylene (PP) and a propylene-ethylene copolymer (RC) where the intrinsic viscosity ratio of the RC over that of the PP is in the range of 0.7 to 1.2. The composition of this invention comprises an intrinsic viscosity ratio of greater than 1.2. This reference also discloses the mathematical quantity defined as the product of the ratio of weight percent PP over weight percent RC times the ratio of the intrinsic viscosity of RC over the intrinsic viscosity of PP to be in the range 1-3; this quantity exceeds a value of 3 for the composition of this invention (Table 1). The compositions of U.S. Pat. No. 6,300,415 exhibit transparency, while the compositions of the present invention typically are opaque with haze values typically well above 70%.

Compositions of U.S. Pat. No. 5,973,078 are blends of olefin polymers, where one component is a high molecular weight branched polymer and the other component can comprise a heterophasic propylene-based polymer. Such compositions are suitable for producing high tenacity fibers and are unrelated to the making of molded articles with enhanced stiffness-impact balance, such as pallets and water-storm chambers. This is in contrast to the present invention, where no branched polymer is used as a blending component, with the polymer structure being substantially linear.

U.S. Pat. No. 6,943,215 relates to an impact-resistant polymer blend comprising (a) a crystalline polypropylene matrix having a weight average molecular weight, and (b) an at least partially crystalline copolymer impact modifier having a molecular weight lower than the weight average molecular weight of the crystalline polypropylene matrix, the impact modifier comprising propylene and ethylene and/or one or more unsaturated co-monomers, the modifier prepared using a non-metallocene, metal-centered, heteroaryl ligand catalyst. Such compositions are in contrast to the present invention wherein the weight average molecular weight of the EPR phase is higher than that of the HPP matrix, as reflected in the constraint Mw XS/Mw XIS of 1.05-1.5, as described below.

Increasing the MFR of the ICP resin to reduce injection molding process cycle time normally has a negative effect on the stiffness-impact balance of the material, causing it not to meet the final product requirements. Therefore, increasing the MFR typically sacrifices impact resistance, leading to undesirable brittle failures.

Conventional products for pallet applications are ICPs of less than about 7.5 MFR, suffering from high cycle time and high injection pressures that are detrimental for the injection molding tools from a mechanical point of view. Therefore, the low MFR ICPs (less than about 7.5) used in the prior art for pallet applications have a negative impact on cycle time and process efficiency, due to their high melt viscosity.

SUMMARY OF THE INVENTION

The present invention relates to an impact-resistant olefin polymer composition comprising a polypropylene matrix having a weight average molecular weight and an ethylene-containing polymer including an ethylene-propylene copolymer having a molecular weight higher than the weight average molecular weight of the polypropylene matrix, said composition containing about 20 to 35 percent xylene solubles, and said ethylene-propylene copolymer (defined as the total xylene soluble fraction of the composition) containing less than about 39 weight percent ethylene units, based on the combined weight of olefin monomers in said copolymer.

The present invention further relates to ICP compositions with a melt flow rate (units in g/10 min.) greater than about 8.5 that meet or exceed all pallet testing requirements. Extrusion (compounding) and pelletization of the inventive compositions to make pellets can be further used for molding and additional compounding. Use of antioxidants, acid scavengers, nucleators, slip agents, clarifiers, impact modifiers, polyethylene, fillers, and chemical modifiers (e.g., peroxide) etc. is possible during the extrusion/compounding step(s).

The compositions of the present invention are useful for a number of other applications such as water-storm chambers, automotive compounding, septic tanks, bins, pales, crates, totes, plastic containers etc., where conceptually similar requirements to the pallet application are needed (e.g., high rigidity, high impact strength and high MFR for favorable processability). In the case of molded articles, a highly glossy surface is sometimes desired; the present compositions can be designed to provide excellent gloss.

DETAILED DESCRIPTION OF THE INVENTION

In preferred embodiments, the compositions of the present invention comprise an ICP with the following structural and additive characteristics: An MFR (total copolymer) greater than about 8.5-9 up to about 25-30; percent xylene solubles (XS) per ASTM D5492 of about 20-35%, with 20-30% preferred; percent C2 wt. in the XS fraction (ASTM D5492) of about 25-39% (by $^{13}$C-NMR), with about 30-38% preferred; Mw XS/Mw XIS of about 1.05-1.5 (average weight molecular weight Mw of impact copolymer fractions measured by HSEC and approximating the ratio of Mw between EPR phase and homopolypropylene (HPP) matrix; XIS is the xylene insolubles fraction of the composition calculated as 100-percentage XS), with a ratio of about 1.06-1.25 preferred; percent isotactic pentads (mmmm) of XIS in the HPP matrix of about 96-98% (preferably about 96.4-97.8%); polydispersity index (rheology, 200° C.) of the HPP matrix (total polymer) less than about 4.6; Mw/Mn of the HPP matrix less than about 6; and a Mz/Mw of the HPP matrix less than about 3. In Table 1 (below), $W_{HPP}$ is defined as the weight percent of HPP matrix in the composition and $W_{EPR}$ represents the weight percent of the ethylene-propylene copolymer in the composition, thus $W_{HPP}+W_{EPR}=100\%$. $W_{HPP}$ and $W_{EPR}$ were calculated from the production rate of HPP matrix and final impact copolymer production rate.

In accordance with the present invention, a minimum creep deflection after a period of 4 weeks at 43° C. was detected. Gloss at 60 degrees is greater than about 85% for the exemplary inventive compositions, however if lower gloss is desired the composition can be modified to control gloss (e.g., gloss at 60 degrees of 45-85% is also feasible). The exemplary inventive compositions (Table 2) surprisingly exhibit greater than about 34 ft-lbs total energy or greater than about 50% ductility at −40° C., as measured by high speed instrumented impact. This is to be compared with 0% ductility at −40° C. for the conventional (low MFR) ICP resins used for pallets (e.g. compositions V and VI of Tables 1 and 2). Percent ductility is defined here as the percentage of round disk specimens (typically a total of 10 specimens are tested) exhibiting ductile failure according to the definition of ASTM D3763-08/X1.8.1 (i.e., specimen is deformed plastically before fracturing and the specimen is without cracks radiating more than 10 mm beyond the center of the impact point). The ductile-to-brittle failure modes (a continuum between ductile and brittle failure that may be hard to separate) are considered as brittle failures in our definition. Additionally, the compositions exhibit 1% secant flexural modulus at 23° C. of greater than about 154,000 psi (more preferably greater than about 160,000 psi), 1% secant flexural modulus at 43° C. of greater than about 99,000 psi, Izod (notched) impact strength at 23° C. of greater than about 4 ft-lb/in., and a reduction in cycle time for injection molding processes (e.g., pallets).

The compositions of the present invention may be prepared according to procedures known in the art. More specifically, the compositions of the invention may be prepared in a sequential polymerization process wherein a propylene polymer (ICP matrix) is prepared first, followed by the preparation of copolymer. The composition described herein can be prepared using a Ziegler-Natta catalyst, a co-catalyst such as triethylaluminum ("TEA"), and an electron donor such as dicyclopentyldimethoxysilane ("DPCMS"), cyclohexylmethyldimethoxysilane ("CMDMS"), diisopropyldimethoxysilane ("DIPDMS"), or other electron donor known in the art. The catalyst system is introduced at the beginning of the polymerization of the propylene polymer and is transferred with the product propylene polymer to the copolymerization reactor where it serves to catalyze the gas phase copolymerization of propylene and ethylene.

The propylene polymer may be prepared using at least one reactor and may be prepared using a plurality of parallel reactors or reactors in series. Preferably, the homopolymerization process utilizes one or two liquid filled loop reactors in series. Despite a preference for liquid filled loop reactors, the propylene polymer may also be prepared in a gas-phase reactor.

Once formation of the propylene polymer (i.e., ICP matrix) is complete, the resultant powder is passed through a degassing vessel so that excess propylene and other gasses may be removed from the fresh resin. After degassing, the propylene polymer is passed to one or more gas phase reactors (preferably two), wherein propylene is copolymerized with ethylene in the presence of the propylene polymer previously produced and the catalyst transferred therewith.

Propylene polymer crystallinity and isotacticity can be controlled by the ratio of co-catalyst to electron donor and the type of co-catalyst/donor system. The appropriate ratio of co-catalyst to electron donor is dependent upon the catalyst and donor selected. It is within the skill of the ordinarily skilled artisan to determine the appropriate ratio to arrive at a product having the presently described properties.

The amount of hydrogen necessary to prepare the homopolymer component of the invention is dependent in large measure on the donor and catalyst system used. It is within the skill of the ordinary skilled artisan to select the appropriate quantity of hydrogen for a given catalyst/donor system to prepare a propylene polymer having the combination of properties disclosed herein without undue experimentation.

For copolymerization, the gas phase composition of the reactor(s) are maintained such that the ratio of the mols of ethylene in the gas phase to the total mols of ethylene and propylene is held constant. In order to maintain the desired molar ratio, monomer feeds of propylene and ethylene are adjusted as appropriate.

Hydrogen can be added in the gas phase reactor(s) to control the molecular weight (thus intrinsic viscosity) of the copolymer. The composition of the gas phase is maintained such that the ratio of hydrogen to ethylene (mol/mol) is held constant. Upon completion of the polymerization process, the polymer powder produced according to the above described procedure can be fed into an extruder. When an extruder is employed, typically, a twin screw extruder is preferred in order to obtain the best melt mixing and dispersion. Despite the preference for a twin-screw extruder, other extruders known in the art, such as a single screw extruder, may be used to achieve the desired melt mixing.

Additives including, but not limited to, antioxidants, acid scavengers, nucleators, antistatics, long term heat agents, slip agents, pigments, processing aids, fillers, polyethylene, impact modifiers, compatabilizers, as well as combinations of any of the aforementioned additives, may be added to the extruder to prepare compositions having specific properties. The extruded polymer strands are subsequently pelletized.

In an exemplary embodiment, the present invention relates to a process for producing a composition including: (i) a polypropylene matrix having a weight average molecular weight and (ii) an ethylene-containing polymer including an ethylene-propylene copolymer having a molecular weight higher than the weight average molecular weight of the polypropylene matrix, said composition containing about 20 to 35 percent xylene solubles, wherein said xylene solubles fraction containing less than about 39 weight percent ethylene units, based on the combined weight of olefin monomers in said copolymer, and said composition has a melt flow rate greater than about 8.5; said process comprising: (a) feeding propylene and hydrogen into a first stage including at least one homopolymerization reactor; (b) polymerizing said propylene in said first stage at a first temperature and pressure in the presence of a catalyst, co-catalyst, and an electron donor to produce a first product; (c) transferring said first product, catalyst, co-catalyst, and electron donor to a second stage including at least one copolymerization reactor; and (d) copolymerizing propylene and ethylene at a second temperature and pressure in the presence of the first product to form said composition.

The present invention is further described in the following non-limiting examples, below.

EXAMPLES

Examples of structural characteristics of inventive versus comparative compositions are depicted in Table 1. In Table 2, a comparison of mechanical (stiffness-impact balance) and optical (gloss) properties of inventive versus conventional (comparative) compositions is demonstrated. Pallet testing pass/fail results were based on in-the-field application tests. In-house tests (Table 2) were developed that adequately trend and are predictive of these tests. These include the −40° C. drop impact testing, 43° C. flexural modulus and the tensile bar creep deflection tests.

Compositions of about 10-12 MFR demonstrated ductile response and were re-usable upon sled impact, while conventional pallet composition V of lower MFR (7.5) demonstrated brittle failures that rendered the pallet not re-usable. This is counterintuitive, as a higher MFR (lower molecular weight) composition is expected to have lower impact performance relative to a lower MFR (higher molecular weight).

It was found that the in-field pallet deflection test results correlated very favorably with 1% secant flexural modulus at 43° C. and the in-house tensile bar creep deflection test data (Table 2).

TABLE 1

Characteristics of inventive versus comparative ICP compositions**

| Composition ID | | I (Inventive) | II (Inventive) | III (Comparative) | IV (Comparative) | V (Comparative) | VI (Comparative) | VII (Comparative) |
|---|---|---|---|---|---|---|---|---|
| Melt Flow Rate (MFR) | ASTM 1238 | 11 | 11.5 | 9.5 | 10.5 | 7.5 | 7.2 | 13 |
| % Xylene Solubles (XS) | ASTM D5492 | 28 | 27.7 | 24.8 | 22.3 | 26.7 | 20.1 | 17.1 |
| % C2 (total) by weight | FTIR, ASTM D5576 | 10.6 | 10.5 | 13.4 | 14.9 | 13.1 | 9.6 | 9 |
| % C2 in XS by weight | $^{13}$C NMR | 34.9 | 35.9 | 39.9 | 45.6 | 42.7 | 37.5 | 37.9 |
| $IV_{XS}/IV_{HPP}$ | Tetralin 135° C. | 1.32 | 1.33 | 1.74 | 1.99 | N/A | N/A | N/A |
| $(W_{HPP}/W_{EPR}) * (IV_{XS}/IV_{HPP})$ | Tetralin 135° C. | 3.4 | 3.5 | 5.3 | 6.9 | N/A | N/A | N/A |
| Mw XS/Mw XIS | HSEC, ASTM D6474 | 1.12 | 1.13 | 1.43 | 1.47 | 1.50 | 1.61 | 0.9 |
| % Crystallinity by Weight | DSC, ASTM D3414 | 51 | 51.4 | 47.8 | 45.8 | 52.6 | 54.4 | 47.3 |
| Crystallization Temp. Tc (° C.) | DSC, ASTM D3414 | 133.6 | 133.6 | 131.7 | 127.7 | 134.8 | 131.7 | 131.5 |
| % mmmm of XIS HPP matrix | $^{13}$C NMR | 97.3 | 97.3 | 96.5 | 96.3 | N/A | N/A | N/A |
| % mmmm of HPP matrix | $^{13}$C NMR | 95.5 | 95.5 | 95.3 | 95.1 | N/A | N/A | N/A |
| % XS of HPP matrix | ASTM D5492 | 1.7 | 1.7 | 1.9 | 2.1 | N/A | N/A | N/A |
| Mw/Mn of HPP matrix | HSEC, ASTM D6474 | 5.8 | 5.8 | 4.9 | 4.8 | N/A | N/A | N/A |
| Mz/Mw of HPP matrix | HSEC, ASTM D6474 | 2.9 | 2.9 | 2.8 | 2.4 | N/A | N/A | N/A |
| Polydispersity of HPP matrix at 200° C. | Dynamic Rheology | 4.6 | 4.6 | N/A | N/A | N/A | N/A | N/A |

**Comparative compositions V and VI are conventional materials (less than about 7.5 MFR) currently used in the pallet industry.

TABLE 2

Mechanical and optical properties of inventive versus comparative ICP compositions*

| Composition ID | | I (Inventive) | II (Inventive) | III (Comparative) | IV (Comparative) | V (Comparative) | VI (Comparative) | VII (Comparative) |
|---|---|---|---|---|---|---|---|---|
| Melt Flow Rate (MFR) | ASTM 1238 | 11 | 11.5 | 9.5 | 10.5 | 7.5 | 7.2 | 13 |
| Pallet Drop Impact | Pallet Customized | Pass | Pass | Pass | Fail | Pass | Fail | Fail |
| Pallet Sled Impact | Pallet Customized | Pass | Pass | Marginal | Fail | Fail | Fail | Fail |
| Pallet Deflection (in) | Pallet Customized | Pass | Pass | N/A | Pass | Pass | Pass | N/A |
| Tensile Bar Creep Deflection (in) | In-House Test | 0.57 | 0.58 | N/A | 0.51 | 0.5 | 0.49 | N/A |
| 1% Secant Flexular Modulus at 23° C. (psi) | ASTM D790 | 165,900 | 166,200 | 154,000 | 157,000 | 164,000 | 183,500 | 160,000 |
| 1% Secant Flexular Modulus at 43° C. (psi) | ASTM D790 | 102,300 | 102,100 | 99,500 | 103,300 | 105,200 | 117,000 | N/A |
| Gloss at 60 Degrees | ASTM D523-08 | 87.8 | 87.9 | 49.3 | N/A | 32.8 | 64.8 | N/A |
| Yield Stress (psi) | ASTM D638-08 | 3,330 | 3,350 | 3,030 | 3,090 | 3,100 | 3,600 | 3,800 |
| % Strain at Yield Point | ASTM D638-08 | 7.7 | 7.7 | 6.2 | 5.2 | 5.6 | 5.6 | 7 |
| Tensile (Tangent) Modulus (psi) | ASTM D638-08 | 184,200 | 190,700 | 165,800 | 191,200 | 183,700 | 218,300 | N/A |
| Notched Izod Impact at 23° C. (ft-lb$_f$/in) | ASTM D256 | 100% NB | 100% NB | 100% NB | 100% NB | 100% NB | 100% NB | 5 |
| IIMP Total Energy at −40° C. (ft-lbs) | ASTM D3763-08 | 34.8 | 38.5 | 37.4 | N/A | 32.7 | 20.7 | N/A |
| % Ductility at −40° C. | ASTM D3763-08 | 50 | 50 | 40 | N/A | 0 | 0 | N/A |

*Comparative compositions V and VI are conventional materials (less than about 8 MFR) currently used in the pallet industry.
NB = Non-break Izod The percentage xylene soluble (XS) fractions of the compositions and their HPP matrix were determined per ASTM D5492. The percentage xylene insolubles (XIS) fractions of the compositions and the HPP matrix were determined from the respective XS fractions as 100-XS. Percent meso-pentad content of the HPP matrix was measured by $^{13}$C NMR according to Zambelli et al., Macromolecules, volume 6, no. 6, 1973, p. 925-926. HPP matrix samples were received from the loop reactors before the occurrence of the copolymerization reaction.

The polydispersity index for the HPP matrix was measured via rheology at 200° C. according to the crossover modulus method. The crossover modulus method is described in Zeichner, G. R., and Patel, P. D., Proc. of the $2^{nd}$ World Congress of Chemical Engineering, Montreal, Vol. 6, p. 373, Montreal, Canada, 1981, as well as in equation 6 as presented in Shroff, R. et al., Journal of Applied Polymer Science, Vol. 57, 1605-1626, 1995. For the HPP matrix, the polydispersity index was measured via frequency sweep oscillatory shear data at 200° C. This data was generated using an Anton Paar controlled strain rheometer employing 25 mm parallel plates with a frequency range from 0.1 to 500 rad/s. For a HPP MFR greater than 40, a standard modulus separation technique can be used, e.g., as described in Yoo, H. J., Advances in Polymer Technology, Vol. 13, 201-205, 1994, Molecular weights (e.g. Mw (weight average molecular weight), Mz (z-average molecular weight)) and molecular weight distribution (Mw/Mn (number average molecular weight)) of the HPP matrix were determined by high temperature size exclusion chromatography (HSEC) at 150° C. in 1,2,4 trichlorobenzene at a concentration of 4 mg of polymer in 2.5 ml of solvent. A Broad Hamielec PP calibration was used with two well characterized internal PP standards (2 and 18 MFR). Total ethylene content was measured by Fourier Transform Infrared Spectroscopy (FTIR) calibrated with $^{13}$C-NMR according to guidelines of ASTM D5576.

The intrinsic viscosity of the XS fraction of the compositions, as well as the intrinsic viscosity of the polypropylene matrix were measured in tetralin at 135° C. using a Desreux-Bischoff dilution viscometer (Ubbelohde-type) on solutions with a concentration of XS fraction of the composition (or total polymer in the case of the polypropylene matrix) in tetralin of 1.5 g/l (concentration at 23° C.).

The percent weight crystallinity and crystallization temperature $T_c$ were measured via differential scanning calorimetry (DSC) according to guidelines of ASTM D3414. Films were pressed from pellets at 200° C. for 3 minutes. These films were subsequently run in a TA Q200 Robotics DSC with a refrigerated cooling system. In the DSC, polymer was melted at 200° C. and equilibrated for 5 minutes. The sample was then cooled to 0° C. at a rate of 10° C./min. while recording the re-crystallization exotherm (cooling curve). The percent crystallinity was determined by integrating the area under the re-crystallization peak on the cooling curve and dividing by 165 J/g.

The melt flow rate (MFR, units in g/10 min.) of the compositions were measured per ASTM 1238 using a load of 2.16 kg at 230° C. One percent secant flexural modulus is measured according to ASTM D790. Measurements were performed at both 23° C. and 43° C. Notched Izod impact strength was measured according to ASTM D256. Tensile properties including % strain at yield point, yield stress and tensile (tangent) modulus, were determined according to ASTM D638-08. High speed instrumented impact (IIMP) properties were measured according to ASTM D3763-08, using circular impact disks with a diameter of 4 inches and a thickness of 0.125 inches (10 replicates were measured for each test). The disks were produced via injection molding according to ASTM D4001. A striker mass of 22.49 kg was used. Impact height was 0.3888 m and the impact velocity was 2.76 m/s. Measurements at −40° C. were performed using a Ceast impact strength machine. The units of IIMP total energy in the disclosed examples are provided in ft-lbs (Table 2) as reported by the Ceast impact strength machine, however they can be converted to rigorous units of energy such as Joule (J) or ft-lb$_f$ in a straightforward manner. Gloss was measured on circular disks (same as the ones used for IIMP) according to ASTM D523-08.

An in-house deflection test, the tensile bar creep deflection, was developed to provide a measure of long term creep deflection. This was found to trend well with the pallet deflection test results. A load of 1 lb. (typically consisting of a collection of circular metal disks) is placed in the middle of a Type I (tensile bar per ASTM D638-08) specimen, which is free to deflect over time under the applied load. The system is placed in a 40° C. oven and the creep deflection is measured in the middle of the specimen over time via a strain (dial) gauge for a period of 14 days. Four specimens were typically tested per material simultaneously yielding a reproducibility of within 6%.

Heterophasic reactor blends and/or extruder blends (e.g., homopolypropylene (HPP) and ethylene-propylene copolymer rubber) with compositions described above are feasible. Extruder blends of heterophasic reactor blends with HPP are also feasible to optimize the stiffness-impact balance, if desired.

The effective use of a moderate or relatively high crystalline HPP matrix in combination with the other polymer attributes listed above was surprising, since a relatively high crystalline matrix has the risk of making brittle material, hampering impact properties due to the incompatibility between the crystalline matrix and the ethylene-propylene rubber phase. A person having ordinary skill in the art would have avoided use of a highly crystalline matrix due to the risk of failing sled impact performance. However, it was unexpectedly found that the relatively high crystalline HPP matrix had no adverse effect on impact performance (e.g. drop impact, sled impact or cold temperature instrumented impact); in fact, superior ductile behavior was unexpectedly observed with the sled impact test. It was also surprisingly found that a very high isotacticity matrix (e.g. mmmm of XIS of the matrix >98%) was not required to meet the creep deflection requirements.

The effective use of a relatively low XS intrinsic viscosity (IV) (low rubber Mw) in the composition was also surprising, as high IV (high Mw) rubber is traditionally believed to result in enhanced mechanical properties such as Izod impact strength and pallet (or other molded article) welding performance. A higher IV (Mw) rubber would normally lead to improved welding performance (weld strength) due to higher density of interfacial polymer entanglements, which would tend to better bond (weld) the surfaces of the top and bottom piece of the pallet. The connection of high interfacial polymer entanglements with excellent weld joint strength has been reported in the literature (e.g., Chaffin et al., Science, Vol. 288, p. 2187, 2000). It has been discovered that, contrary to the prior art, the use of a rubber with lower IV resulted in enhanced impact resistance (e.g., ductile response in the sled impact test) and welding performance (welding strength) of the pallets (e.g., welding of top and bottom pieces of the pallet via a variety of welding techniques such as heating/press process or a vibration welding technique known in the art).

The use of propylene-rich (C3-rich) rubber to pass the sled impact test was also not intuitive, as it is common practice to use ethylene-rich (C2-rich) rubber (e.g., greater than about 40% wt. in the XS fraction) to achieve lower temperature impact resistance. This is due to the lower glass transition temperature of the C2-based polymer relative to the C3-based polymer. Additionally, higher rubber contents are more easily achieved as the reactivity of C2 is much higher than that of C3. Thus, it was surprisingly discovered that the C3-rich rubber of the composition contributed to enhanced low temperature ductility (e.g., −40° C.).

In a particularly preferred embodiment, the present invention relates to an impact-resistant olefin polymer composition with a MFR greater than 10 comprising (a) a polypropylene matrix having a weight average molecular weight and (b) an ethylene-containing polymer including an ethylene-propylene copolymer having a molecular weight higher than the weight average molecular weight of the polypropylene matrix, said composition containing about 26 to 30 percent xylene solubles, and said xylene solubles fraction containing less than about 39 weight percent ethylene units, based on the combined weight of olefin monomers in said copolymer.

It is particularly preferred to produce in situ reactor heterophasic blends with compositions described above in order to generate optimal adherence between the EPR and HPP matrix, resulting in improved mechanical properties. Blending of the individual components (EPR and HPP) made separately in the reactor in an extruder (twin and/or single screw) is also possible. In addition, blends of in situ reactor heterophasic blends with HPP and/or propylene-ethylene random copolymers or combinations thereof in an extruder is also possible to optimize the stiffness-impact balance for the particular needs of the application at hand. A high MFR polypropylene impact copolymer (ICP), namely in the range 8-30, is especially useful for pallet injection molding applications as well as water storm chambers, automotive compounding, septic tanks, bins, pales, crates, totes, plastic containers etc.

Thus and as described above, the present invention provides: Enhanced processability, i.e., savings in cycle time and lower injection pressures due to the higher MFR/lower melt, viscosity, enhanced stiffness/rigidity and creep resistance (e.g., passing deflection test); enhanced high speed instrumented impact (both room and cold temperature) and sled impact performance relative to lower MFR (higher Mw) ICPs; and enhanced gloss and surface appearance. Compositions can be used as stand-alone resins without the need for an extra blending step in the case of pallets and water-storm chamber applications. Such compositions can be further used as building blocks in compounding applications.

While the present invention has been described with respect to particular embodiments thereof, it is apparent that numerous other forms and modifications of the invention will be obvious to those skilled in the art. The appended claims and the present invention generally should be construed to cover all such obvious forms and modifications which are within the true spirit and scope of the present invention.

What is claimed is:

1. An impact-resistant olefin polymer composition comprising: (a) a propylene based matrix having a weight average molecular weight and (b) an ethylene-containing polymer including an ethylene-propylene rubber copolymer having a molecular weight higher than the weight average molecular weight of the propylene based matrix, said composition containing about 20 to 35 percent xylene solubles, wherein about 96-98 percent isotactic pentads (mmmm) of xylene insolubles are present in the propylene based matrix, said xylene solubles fraction contains from about 25 to about 39 weight percent ethylene units, based on the combined weight of olefin monomers in said copolymer, the ratio of weight average molecular weight of xylene solubles to weight average molecular weight of xylene insolubles of the composition is about 1.05 to about 1.5 and said composition has a melt flow rate greater than about 8.5 g/10 minutes.

2. The olefin polymer composition of claim 1, wherein said composition has a 43° C. flexural modulus (1% secant) of greater than 99 KPSI, a −40° C. % instrumented impact total energy of greater than about 34 ft-lbs or a percent ductility higher than about 50% at −40° C.

3. The olefin polymer composition of claim 1, wherein said xylene soluble fraction of the composition comprises from about 30 to about 38 weight percent ethylene units.

4. The olefin polymer composition of claim 1, wherein the polypropylene matrix is a homopolypropylene (HPP) matrix.

5. The olefin polymer composition of claim 1, wherein said composition has a melt flow rate of from about 8.5 to about 30 g/10 minutes.

6. The olefin polymer composition of claim 1, wherein the ratio of weight average molecular weight of xylene solubles to weight average molecular weight of xylene insolubles is about 1.06 to about 1.25.

7. The olefin polymer composition of claim 4, wherein the ratio of weight average molecular weight to number average molecular weight of the HPP matrix is less than about 6.

8. The olefin polymer composition of claim 4, wherein the polydispersity index of the HPP matrix is about 4.6 or less.

9. The olefin polymer composition of claim 1, wherein said composition has a melt flow rate greater than 10 g/10 minutes, and about 26 to 30 percent xylene solubles.

10. A process for producing a composition including: (i) a propylene based matrix having a weight average molecular weight and (ii) an ethylene-containing polymer including an ethylene-propylene rubber copolymer having a molecular weight higher than the weight average molecular weight of the propylene based matrix, said composition containing about 20 to 35 percent xylene solubles, wherein about 96-98 percent isotactic pentads (mmmm) of xylene insolubles are present in the propylene based matrix, said xylene solubles fraction contains from about 25 to about 39 weight percent ethylene units, based on the combined weight of olefin monomers in said copolymer, the ratio of weight average molecular weight of xylene solubles to weight average molecular weight of xylene insolubles of the composition is about 1.05 to about 1.5, and said composition has a melt flow rate greater than about 8.5 g/10 minutes;

said process comprising: (a) feeding propylene and hydrogen into a first stage including at least one homopolymerization reactor; (b) polymerizing said propylene in said first stage at a first temperature and pressure in the presence of a catalyst, co-catalyst, and an electron donor to produce a first product; (c) transferring said first product, catalyst, co-catalyst, and electron donor to a second stage including at least one copolymerization reactor; and (d) copolymerizing propylene and ethylene at a second temperature and pressure in the presence of the first product to form said composition.

11. The process of claim 10, wherein said composition is molded into an article including pallets, water storm chambers, automotive compounding, septic tanks, bins, pales, crates, totes and plastic containers.

* * * * *